Aug. 10, 1965    H. R. MALLORY    3,200,320
CHARGING MEANS WITH MAGNETIC CONTACTS FOR
BATTERY OPERATED APPLIANCES
Filed Nov. 13, 1962
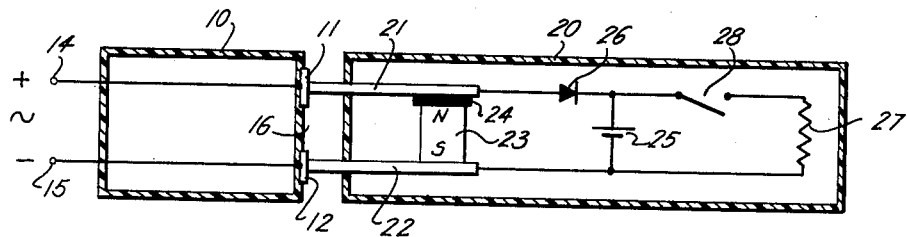
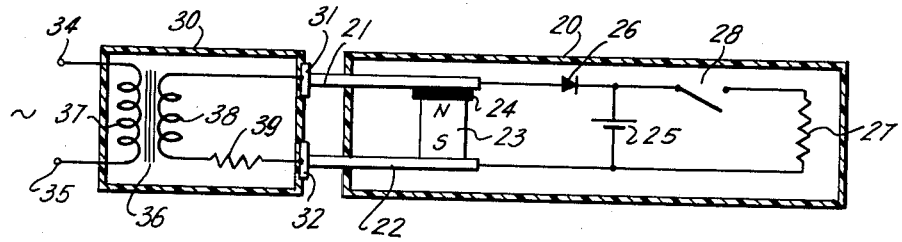
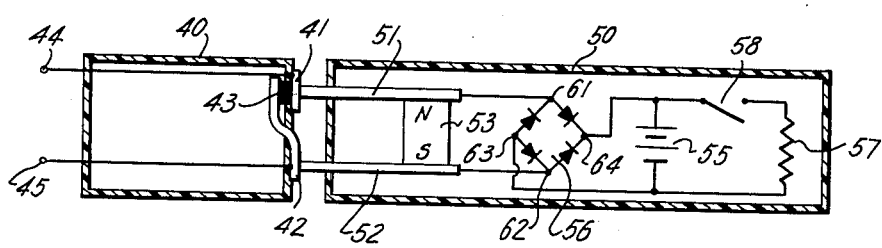
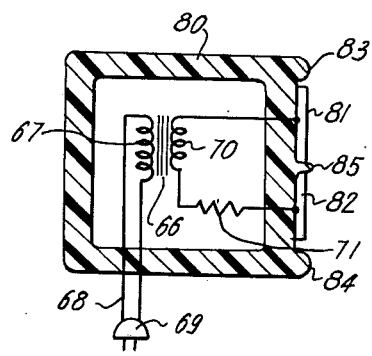
INVENTOR.
HENRY ROGER MALLORY
BY
ATTORNEY United States Patent Office 3,200,320
Patented Aug. 10, 1965

3,200,320
CHARGING MEANS WITH MAGNETIC CONTACTS
FOR BATTERY OPERATED APPLIANCES
Henry Rogers Mallory, Greenwich, Conn., assignor to
P. R. Mallory & Co., Inc., Indianapolis, Ind., a corporation of Delaware
Filed Nov. 13, 1962, Ser. No. 237,274
8 Claims. (Cl. 320—2)

This invention relates to rechargeable battery operated devices, such as flashlights, electric razors, power-driven toothbrushes, food and drink mixers and, more particularly, to novel and improved charging means for devices of the described character.

The present practice in making small, portable rechargeable devices is to seal the rechargeable battery into the device so that the battery is not replaceable or removable for charging. The charging circuit may be built in with the battery and with the load and may be completed by exposing standard parallel twin prongs which may be inserted into any standard A.C. power outlet or by the use of a wired in or removable plug-in extension cord which are plugged into any A.C. power outlet.

Some portable rechargeable battery devices do not include a built-in charger but are charged by a separate charger which may be connected to the standard A.C. power outlet in various ways. Thus, the charger may be directly plugged in into the power line outlet and a similar direct plug-in connection may be established between the charger and the rechargeable device. It is also possible, of course, to substitute an extension cord for either or both of these plug-in connections. Of all rechargeable battery devices now on the market the most successful and the handiest to use is an automatic toothbrush having a structurally separate, wall-mounted combination holder-charger, which is connected to a standard A.C. power outlet all of the time. Contact means are provided on the toothbrush, as well as on the holder, whereby the charging circuit is completed merely by slipping in the automatic toothbrush into the holder.

In all of the above-mentioned combinations of rechargeable battery devices and chargers, successful operation or charging was predicated upon low resistance electrical contact between one or more pairs of cooperating contact springs. While initially most of the devices would perform satisfactorily when the contact springs were well-adjusted, new and clean and the contact pressure was adequate, field service troubles and other operating difficulties would develop in time and would interfere with proper operation of the devices. These difficulties were accentuated by the fact that most of the devices of the described class are sold at a relatively low price which precluded the incorporation of complex and more expensive, but also more reliable, contact assemblies therein. Also, the devices were bought and used primarily by the general public and thus were exposed to rough handling, which has further aggravated the above difficulties. Clearly, the inadequacy of conventional contact means constituted a serious problem for which so far no fully satisfactory solution has been offered.

I have discovered a simple, inexpensive and highly effective solution of the outstanding problem.

It is an object of the present invention to improve rechargeable battery devices.

It is another object of the present invention to provide a novel and improved rechargeable battery device and a structurally independent charger therefor wherein no spring contact means are used for connecting said device to its charger.

It is a further object of the present invention to provide improved rechargeable battery devices adapted to be mechanically and electrically connected to a charger instrumentality by magnetic contact means permanently assuring high contact pressure.

The invention also contemplates a rechargeable battery device and separate charger therefor comprising magnetic means for establishing an electric charging circuit therebetween, which are simple in construction, reliable in operation and which may be readily manufactured and sold on a practical and commercial scale at a low cost.

Other and further objects and advantages of the present invention will become apparent from the following description, taken in conjunction with the accompanying drawing, in which FIG. 1 is a schematic view, somewhat diagrammatic and fragmentary in character, of a rechargeable battery device and its separate charger embodying the invention;

FIG. 2 is a similar view illustrating a modified embodiment of the present invention;

FIG. 3 is a view similar to those shown in FIGS. 1 and 2 and illustrates a further modification of the invention; and FIG. 4 is transverse sectional view, also somewhat diagrammatic and fragmentary in character, of a separate charger adapted to cooperate with the rechargeable battery devices of the invention.

Broadly stated, in accordance with the invention, the conventional spring contacts now used for providing electrical connection between a rechargeable battery device and its separate charger are replaced by mechanically rigid contacts of magnetic material assuring high contact pressure and thus reliable electrical connection of low resistance by magnetic attraction.

Various rechargeable battery devices are equipped with a holding magnet assembly to hold the device against any flat steel surface, such as an automobile body, refrigerator, stove, file cabinet, and the like. However, these conventional holding magnets have no electrical function and merely serve for removably holding the device against the ferromagnetic surface.

According to one of the major aspects of the invention, the metallic pole shoes of a holding magnet system are electrically insulated from each other and are connected through one or more blocking diodes or rectifiers to the rechargeable battery. The said blocking diodes or bridge rectifier not only can provide rectification of an alternating current input but are also effective in preventing discharge or short circuiting of the battery when the holding magnet system is used as a holding means against an uninsulated or unpainted piece of steel which would electrically connect or short circuit the two pole shoes together.

According to another important aspect of the invention, the separate charging device is equipped with two electrically insulated steel retention plates respectively connected to the two terminals of the charging power source. These retention plates are located side by side in such a plane as to conform to and to cooperate with the pole shoes on the rechargeable battery device. Thus, the said plates not only constitute part of a magnetic retention system for the holding magnet in the rechargeable battery device but also serve as means for electrically completing the charging circuit between the charging power source and the rechargeable battery.

Referring now more particularly to FIG. 1 of the drawing, reference numeral 10 denotes a casing of insulating material for the separate charger having a pair of steel retention plates, 11 and 12, mounted on its face, the said plates being respectively connected to terminals 14 and 15 of the charging power source, which may be either A.C., or D.C. of the right polarity. Air gap 16 between the retention plates 11 and 12 is close enough to maintain the magnetic circuit substantially closed and thus to present a sufficiently strong magnetic "keeper" or retention plate system to hold the rechargeable battery device against mechanical shock that may occur in normal use. An air gap of about 1/32" has been found satisfactory for this purpose as it is sufficient to prevent accidental short circuits between the plates without unduly weakening the flux in the magnetic circuit.

Reference numeral 20 denotes the insulative casing of the portable rechargeable battery device from which slightly extend pole shoes 21 and 22 of ferromagnetic material arranged for cooperation with retention plates 11 and 12, respectively. A strong permanent magnet 23 of a suitable magnetic alloy, such as one sold under the name of Alnico V, is arranged between pole shoes 21 and 22 to provide a magnetic field therebetween, a thin layer of insulating material 24 being interposed between magnet 23 and pole shoe 21. The function of this insulating layer is to insulate the two pole shoes from each other without appreciably weakening the total magnetic pull of the magnet system. A film of Mylar (polyethylene terephthalate resin) having a thickness of 0.001" has been found very satisfactory for the purpose. One terminal of rechargeable battery 25 is connected to pole shoe 21 through a blocking diode 26, while its other terminal is directly connected to pole shoe 22. A load 27, which may be an incandescent lamp, an electric motor, an electronic circuit, or any other current consuming device, may be connected across battery 25 by means of a manually operable switch 28.

From the foregoing description, the operation of the charging means of the invention will be readily understood by those skilled in the art. When it is desired to charge up the rechargeable battery device in case 20, all that is needed is to bring it into proximity of the separate charger in case 10 so that pole shoes 21 and 22 will be strongly attracted to retention plates 11 and 12, respectively, making a reliable electrical contact therewith and completing the charging circuit. Assuming that the charging power source connected to terminls 14 and 15 is of higher potential than the voltage of battery 25, diode 26 will conduct in its forward direction, permitting charging current from terminal 14 of the source to flow from retention plate 11 to its mating pole shoe 21, then through diode 26, battery 25, pole shoe 22 and its retention plate 12 back to terminal 15 of said source. Preferably, during charging, load 27 should be disconnected from the battery 25 by opening switch 28.

After the charging operation is completed, the rechargeable battery device in casing 20 can be simply pulled away from the charger in casing 10, thus interrupting both the magnetic and the electric circuit between the two units. Now, the device may be used independently for its intended purpose, whenever desired, by closing switch 28. Blocking rectifier 26 has two functions of which the first one is to serve as a half wave rectifier converting the A.C. to D.C. when terminals 14 and 15 are connected to an A.C. source. Another important function of the said rectifier is to block current flow and to prevent accidental discharge of the battery, should the pole shoes 21 and 22 be shorted together when the holding magnet is applied to and is retained against an unpainted, uninsulated steel plate. If the two pole shoes are short circuited, substantially no current will flow out of the battery through the said short circuited pole shoes as diode 26 is then in the blocking or reverse direction.

FIG. 2 illustrates a modified embodiment of the invention. As the rechargeable battery device in casing 20 is identical with the one shown in FIG. 1 and similar reference numerals have been used to denote corresponding parts, no detailed description thereof will be necessary. As to the separate charger in insulative casing 30, this comprises an isolating transformer 36, the primary winding 37 of which has its respective ends connected to A.C. input terminals 34 and 35. Secondary or low voltage winding 38 has one of its ends directly connected to retention plate 31, whereas its other end is connected through a current limiting resistance 39 to retention plate 32. The function of resistance 39 is to prevent the transformer from burning up should the two retention plates be accidentally short circuited. The current limiting resistance may be eliminated by designing sufficient reactance into one or both windings of the transformer to make the transformer itself current limiting as this is common practice in making bell ringing transformers. The advantage of the charger just described is that the exposed and externally accessible retention plates are connected to a relatively low voltage and that the said retention plates can be completely isolated from the power line and from the ground. In view of the similarity of construction, operation of this modified embodiment of the invention will be readily understood by those skilled in the art without further description.

The modification of the invention illustrated in FIG. 3 comprises several important improvements. Considering first the charger in insulative casing 40, instead of the spaced retention plates shown in FIGS. 1 and 2, a pair of overlapping retention plates 41 and 42 are used, the overlapping portions of which are separated and are electrically insulated from each other by a thin layer of interposed insulation 43, which may be a Mylar film about 0.001" in thickness. It has been found that this retention plate system in which the air gap area has been substantially increased and the gap distance has been substantially decreased provides results which are superior to the system described in connection with FIGS. 1 and 2 where the air gap had a relatively small area and where the length of the gap could not safely be reduced without risking short circuits. Retention plates 41 and 42 are respectively connected to terminals 44 and 45 of an alternating or direct current source.

The rechargeable battery device in insulative casing 50 comprises pole shoes 51 and 52 arranged for cooperation with retention plates 41 and 42, respectively. A permanent magnet 53, such as one preferably made of a substantially electrically non-conducting ceramic magnetic composition is assembled with the two pole shoes, for example by means of a nylon eyelet or rivet (not shown) extending therethrough. The use of a ceramic magnet instead of a metallic magnet has the advantage that it eliminates the necessity of providing a layer of insulation between the magnet and at least one of the pole shoes. In one practical case, two pole shoes have been assembled with a ceramic magnet sold under the name of Indox and having a size of 1" x 3/4" x 1/4". A resistance of 60,000 ohms has been measured between the two pole pieces and, in combination with the overlapping retention plates just described, a pull of over 4 pounds has been obtained with this magnet assembly.

Pole shoes 51 and 52 are connected to input terminals 61 and 62 of full-wave rectifier bridge 56, respectively. Output terminals 63, 64 of said bridge are respectively connected to battery 55, shown here as one comprising two cells although, of course, any desired number of cells may be used in this, or in any other embodiment of the invention. A load 57 may be connected across battery 55 by means of a manually operable switch 58.

The operation of this alternative embodiment of the invention will be readily understood by those skilled in the art without any detailed description. It will be sufficient to state that the bridge rectifier 56 comprises four diodes so connected as to provide full wave rectification. Thus, when terminals 44, 45 of the charger are connected to an A.C. source, the said bridge rectifier will provide charging current to battery 55 on both half cycles of the A.C. wave. When, on the other hand, the said terminals 44, 45 are connected to a D.C. source, charging current of the proper polarity will be applied to battery 55 regardless of the polarity of the D.C. source. Also, bridge rectifier 56 serves as a blocking diode or diodes to prevent discharge of the battery should pole shoes 51 and 52 be short circuited.

The modification of the invention shown in FIG. 3 is very suitable for automotive use in which case the two retention plates 41, 42 are connected to the 12 volt automobile battery, preferably through a current limiting resistor (not shown). With the use of full wave bridge rectifier 56, the polarity of the connection to the automobile battery is of no concern since the bridge rectifier will always provide charging current of proper polarity to battery 55 regardless of which retention plate is connected to the positive or negative terminals of the automobile battery.

FIG. 4 is a transverse sectional view of a separate charger adapted for cooperation with any one of the rechargeable battery devices embodying the invention. It comprises a casing 80 of insulating material, such as one molded of a suitable plastic, having retention plates 81 and 82 of metallic ferromagnetic material secured in adjacent positions on suitably recessed portions of the casing. The said casing is formed with protuberances 83 and 84 at each end of the surface holding the retention plates and a similar integrally formed protuberance 85 extends through the gap between said plates. Within casing 80, there is provided a transformer 66, preferably one of the step-down type, primary winding 67 of which may be connected to an A.C. power line outlet by means of cord 68 and conventional plug 69. Secondary winding 70 of the said transformer has one of its ends directly connected to retention plate 81, while its other end is connected to retention plate 82 through a current limiting resistor 71. The principal advantage of this form of charger construction resides in the recessed mounting of retention plates 81, 82 which will automatically assure proper alignment of the pole shoes and thus reliable electrical connection between the charger and the rechargeable battery device. Also, as the retention plates are below the plane determined by protuberances 83, 84 and 85, they cannot be accidentally short circuited, for example by applying one or both of the pole shoes transversally across the said plates.

Although the present invention has been disclosed in connection with a few preferred embodiments thereof, variations and modifications may be resorted to by those skilled in the art without departing from the principles of the invention. Thus, the cooperating surfaces of the retention plates and pole shoes may be plated or coated with corrosion-resistant metals, such as, for example, nickel, chromium, gold, and the like, to assure low resistance electrical contact therebetween for long periods of time. All of these variations and modifications are considered to be within the true spirit and scope of the present invention, as disclosed in the foregoing description and defined by the appended claims.

What is claimed is:

1. Contact means for separably connecting together two electrical circuits comprising, in combination, a first electrical circuit having two terminals, a pair of spaced and partially overlapping ferromagnetic retention plates respectively connected to said terminals, and a thin layer of insulation interposed between the overlapping portions of said retention plates to electrically insulate one from the other while interposing a minimum of reluctance to the magnetic flux, said plates being adapted for respective cooperation with a pair of pole shoes having a permanent magnetic field established therebetween while being electrically disconnected from each other and constituting terminals of a second electrical circuit, whereby upon contact of each retention plate with the corresponding pole shoe a reliable but readily separable electrical connection is established between said first and second circuits.

2. A rechargeable battery device comprising, in combination, a casing, a rechargeable battery having terminals of opposed polarity in said casing, a pair of spaced pole shoes respectively connected to said terminals in said casing and having their ends extending therefrom, means for establishing a magnetic field between said pole shoes while maintaining them electrically disconnected from each other, and at least one blocking diode interposed between one pole shoe and the corresponding terminal of said battery, the ends of said pole shoes being adapted to respectively cooperate with a pair of spaced and insulated retention plates constituting terminals of an electric charging circuit thereby connecting said battery to said charging circuit by magnetic attraction, said blocking diode being so poled as to permit flow of current through the battery in the charging direction while blocking the flow of current from the said battery and through said pole shoes in the discharging direction.

3. The rechargeable battery device according to claim 2, wherein the means for establishing a magnetic field between the pole shoes comprise a metallic permanent magnet one end of which is in contact with one pole shoe and the other end of which is spaced from the second pole shoe by inter-position of a thin layer of insulating material.

4. The rechargeable battery device according to claim 2, wherein the means for establishing a magnetic field between the pole shoes comprise a permanent magnet made of material of high electrical resistivity the two ends of which are in direct contact with the respective pole shoes.

5. A rechargeable battery device comprising, in combination, a casing, a rechargeable battery having terminals of opposed polarity in said casing, a pair of spaced pole shoes respectively connected to said terminals in said casing and having their ends extending therefrom, means for establishing a magnetic field between said pole shoes while maintaining them electrically disconnected from each other, at least one unidirectional conductor interposed between said pole shoes and said battery, a load circuit for said battery, and switching means for connecting said load circuit to said battery and for disconnecting it therefrom.

6. The rechargeable battery device according to claim 5, wherein the unidirectional conductor interposed between the pole pieces and the battery is in the form of a bridge rectifier.

7. A rechargeable battery device comprising, in combination, an insulative casing, a rechargeable battery having terminals in said casing, a pair of electrically insulated pole shoes respectively connected to said terminals in said casing and having their free ends extending therefrom, means for establishing a permanent magnetic field between said pole shoes, unidirectional components interposed between said pole shoes and said battery, a load circuit for said battery in said casing, and manually operable elements for connecting said load circuit to said battery, the free ends of said pole shoes being adapted to respectively cooperate with a pair of insulated ferromagnetic retention plates constituting terminals of a charging circuit to charge said battery.

8. A charger for rechargeable battery devices comprising, in combination, an insulative casing, a pair of spaced ferromagnetic retention plates each having a portion which is exposed to contact exteriorly of the casing and having overlapping portions, a thin layer of insulation interposed between said overlapping portions maintaining the said plates electrically disconnected from each other, said overlapping portions with the insulation therebetween constituting a magnetic gap of negligible reluctance, and means for connecting said plates to the respective terminals of a source of charging current, the exposed portions of said plates being adapted to cooperate with electrically insulated pole pieces of a rechargeable battery device to establish a charging circuit for said device by magnetic attraction.

References Cited by the Examiner

UNITED STATES PATENTS

| | | | |
|---|---|---|---|
| 2,170,287 | 8/39 | Kinnebrew | 339—12 |
| 2,556,956 | 6/51 | Benton et al. | 339—193 |
| 3,005,090 | 10/61 | Moore | 320—3 X |
| 3,038,139 | 6/62 | Bonanno | 339—12 |
| 3,144,527 | 8/64 | Tolegian | 339—12 X |

FOREIGN PATENTS

| | | |
|---|---|---|
| 128,831 | 9/48 | Australia. |
| 1,051,163 | 2/59 | Germany. |

MAX L. LEVY, *Primary Examiner.*